United States Patent
Codega et al.

(10) Patent No.: US 10,253,802 B2
(45) Date of Patent: Apr. 9, 2019

(54) CARABINERS WITH KEY-LOCK SYSTEM

(71) Applicant: CAMP S.P.A., Premana, Lecco (IT)

(72) Inventors: Antonio Codega, Lecco (IT); Luca Gai, Lecco (IT)

(73) Assignee: Camp S.P.A., Premana, Lecco (IT)

( * ) Notice: Subject to any disclaimer, the term of this patent is extended or adjusted under 35 U.S.C. 154(b) by 0 days.

(21) Appl. No.: 14/490,737

(22) Filed: Sep. 19, 2014

(65) Prior Publication Data

US 2015/0074959 A1    Mar. 19, 2015

(30) Foreign Application Priority Data

Sep. 19, 2013 (IT) .............................. MI2013A1544

(51) Int. Cl.
*F16B 45/02* (2006.01)
*A63B 29/00* (2006.01)

(52) U.S. Cl.
CPC .............. *F16B 45/02* (2013.01); *A63B 29/00* (2013.01); *Y10T 24/45361* (2015.01)

(58) Field of Classification Search
CPC .............. F16B 45/02; Y10T 24/45319; Y10T 24/45236; Y10T 24/45272; Y10T 24/45335; Y10T 24/4534; Y10T 24/45361; Y10T 24/45366; Y10T 24/45414; Y10T 24/45435; Y10T 24/45445; Y10T 29/49826; Y10T 29/49947
USPC ...... 24/428, 598.1, 598, 599.1, 599.9, 601.5
See application file for complete search history.

(56) References Cited

U.S. PATENT DOCUMENTS

| | | | | |
|---|---|---|---|---|
| 2005/0229367 A1* | 10/2005 | Thompson | ................... | 24/599.9 |
| 2006/0137151 A1* | 6/2006 | Thompson | ................... | 24/598.2 |
| 2008/0022497 A1* | 1/2008 | Thompson | ................... | 24/598.1 |
| 2009/0056088 A1* | 3/2009 | Petzl et al. | ................... | 24/599.9 |
| 2010/0139056 A1* | 6/2010 | Hall | ............................. | 24/598.1 |
| 2010/0186202 A1* | 7/2010 | Schwappach et al. | ...... | 24/599.9 |
| 2011/0023275 A1* | 2/2011 | Thompson | ................... | 24/594.1 |
| 2012/0297590 A1* | 11/2012 | Spataro et al. | ............. | 24/599.9 |
| 2012/0317762 A1* | 12/2012 | Tardif | .......................... | 24/601.5 |

FOREIGN PATENT DOCUMENTS

| | | |
|---|---|---|
| EP | 0822348 A1 | 2/1998 |
| EP | 2196687 A2 | 6/2010 |

OTHER PUBLICATIONS

Ralph Stöhr, Karabinertypen und Herstellung, © Klettern, Oct. 15, 2009, Ausgabe Sep. 2009, http://www.klettern.de/test/karabinertypen-und-herstellung.359484.5.htm.

* cited by examiner

*Primary Examiner* — Victor D Batson
*Assistant Examiner* — David M Upchurch
(74) *Attorney, Agent, or Firm* — Davis & Bujold PLLC; Michael J. Bujold

(57) ABSTRACT

Carabiners having locking systems of the type called "key-lock" for mountaineering and climbing are provided. Such carabiners include those having a ring with a side, interrupted by an opening delimited by a first and a second end, wherein said opening is closed by a spring closing element which can take an open position and a closed position, wherein the first end of the ring comprises a bulb-shaped hooking portion, with the projecting part in a direction transverse to the plane of the carabiner, wherein the coupling portion on both sides of the bulb includes a shoulder having an uneven surface.

4 Claims, 3 Drawing Sheets

CARABINERS WITH KEY-LOCK SYSTEM

CROSS REFERENCE TO RELATED APPLICATION

This application claims priority to and benefit of Italian Patent Application No. MI2013A001544 filed Sep. 19, 2013, the contents of which are hereby incorporated by reference in their entirety.

FIELD OF THE INVENTION

The present invention relates to carabiners, in particular carabiners having a locking system of the type called "key-lock" for mountaineering and climbing.

BACKGROUND OF THE INVENTION

There are various types of carabiners for mountaineering and climbing. One such type includes those utilizing ring nuts, usable in particular for hooking a harness. Another type includes lever or wire carabiners which are normally used for quickdraws. In all cases, carabiners must be resistant to accidental opening, in particular when the carabiner is under load, such as in the case of a fall. In fact, when carabiners are under load, many forms of deformation may occur with the risk of creating non-optimal coupling between the mobile end of the closing element and the point of contact thereof with the coupling portion of the ring.

In order to reduce these drawbacks, carabiners are used which include a sort of hook that engages the end of the lever. While this solution increases the safety of the climber, the hook can interfere with movement of the rope thereby making extraction from the carabiner difficult during some phases of the climb.

The so-called "key-lock" fixing system shapes the end of the coupling ring as a T according to a cross section with respect to the plane in which the carabiner lies. The lever consequently has a coupling head of complementary shape, so as to achieve a shape coupling. This fastening system prevents the hook effect of conventional lever carabiners and ensures an acceptable level of safety against accidental opening, even if the risk of opening is still not averted.

SUMMARY OF THE INVENTION

The present invention provides carabiners of the lever type, in particular of the type provided with a "key-lock" system, which provides greater resistance to opening when carabiners are under load.

Carabiners as outlined in the appended claims, include those having a side, interrupted by an opening delimited by a first and a second end, wherein said opening is closed by a spring closing element which can take an open position and a closed position, wherein the first end of the ring comprises a bulb-shaped hooking portion, with the projecting part in a direction transverse to the plane of the carabiner, wherein said coupling portion on both sides of the bulb comprises a shoulder having an uneven surface.

Further features and advantages of the present invention will appear more clearly from the description below of embodiments thereof and by way of non-limiting examples with reference to the following figures.

DETAILED DESCRIPTION

Figure 1:
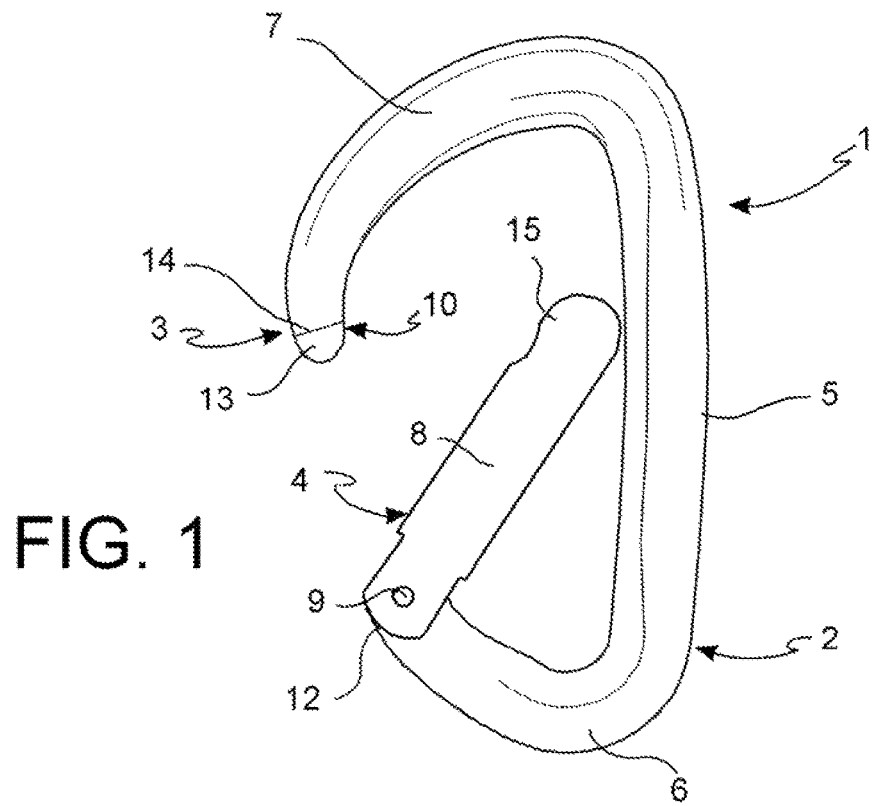
FIG. 1 shows a plan view of a carabiner in an open position according to the present invention.

With reference to the figures, carabiners according to the present invention, are indicated in their entirety with reference numeral 1 and include a ring 2 having a first side 3 interrupted by an opening delimited by a first and a second end 10, 12. The opening may be closed by a spring closing element 4 which can take an open position to allow the introduction in the carabiner 1 of a rope or a ring of a different device, and a closed position, wherein closing element 4 closes ring 2 of the carabiner, preventing the escape of said rope or ring of such device.

In one embodiment, ring 2 has a first and a second side 3, 5 converging and connected by a first and a second loop 6, 7, wherein the first loop 6 has a smaller radius of curvature than the second loop 7.

The first end 10 of the ring 2 may include a coupling portion 13. The coupling portion 13 may be bulb-shaped with the projecting part in a direction transverse to the plane of the carabiner 1. In this way, a hook effect for the rope passing through the carabiner is prevented.

Figure 4:
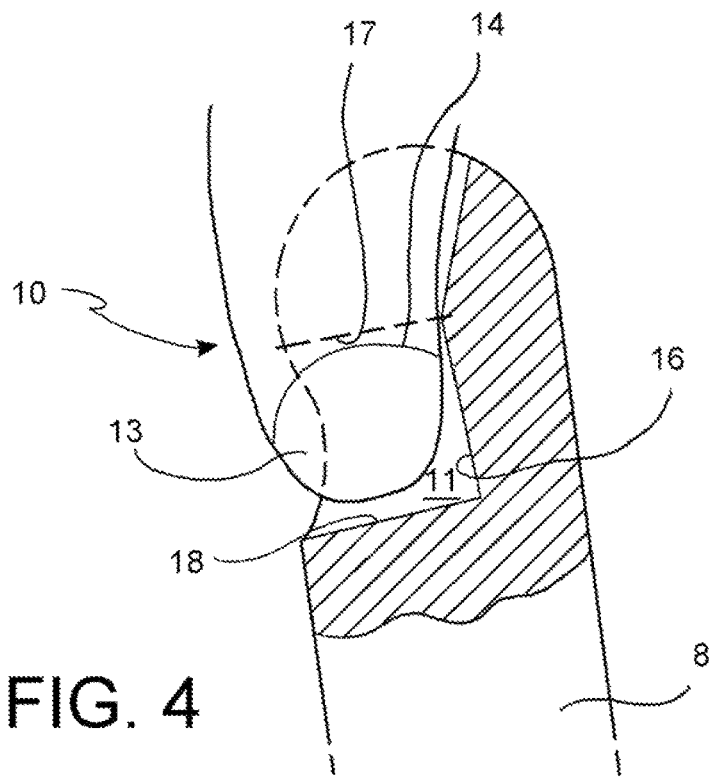
FIG. 4 shows a sectional view of a detail of a carabiner according to another embodiment of the invention.
Figure 3:
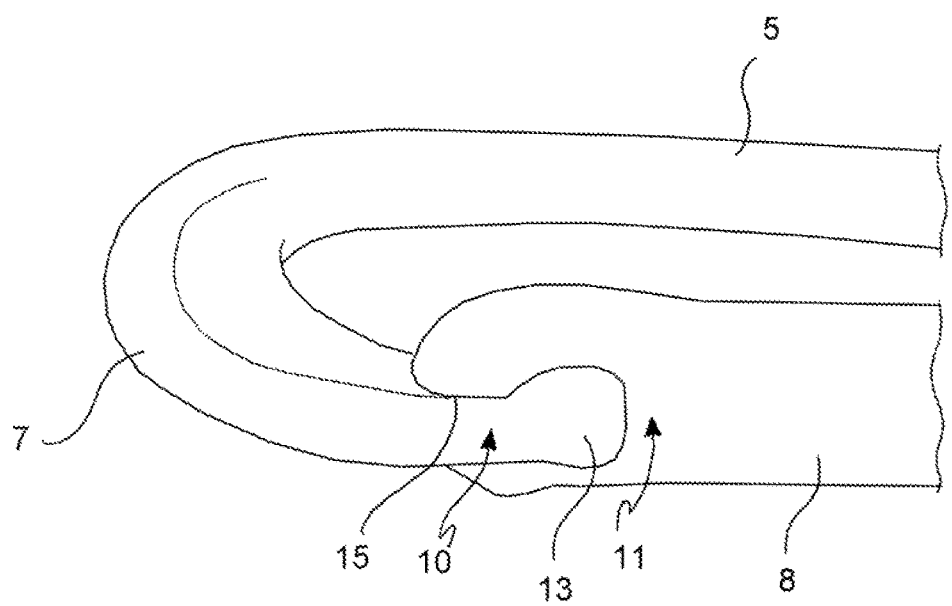
FIG. 3 shows a perspective view of the detail in FIG. 2A.

The bulb-shaped coupling portion 13 therefore may include on both sides of the bulb a shoulder 14 having an uneven surface. In particular, as shown in the embodiments in FIGS. 1, 1A, 2A and 2B, the surface of the shoulder 14 may be convex with a broken line profile, while in the embodiment in FIG. 4 it may be convex with a continuous line profile.

The closing element 4 may include a tubular body 8, in which closing element 4 is longer than the width of the opening of the first side 3. The tubular body 8 may have a hinge 9 at the second end 12 of the first side 3 and may have, at the opposite end 10, a seat 11 having such a shape and size as to allow the introduction of the coupling portion 13 of the first end 10 of the side 3 and the stop thereof in abutment inside seat 11.

Figures 2A, 2B:
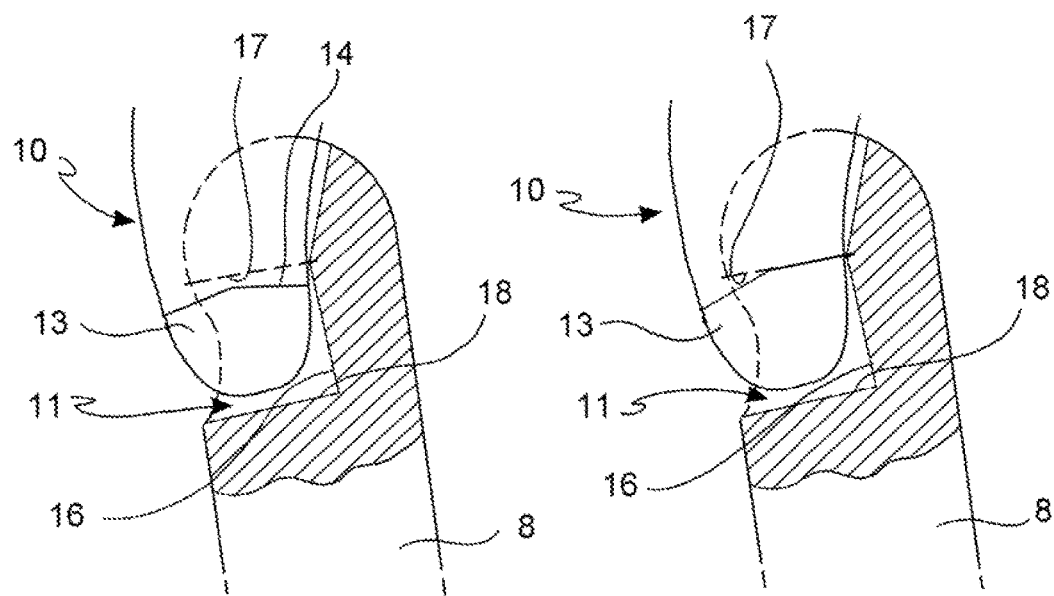
FIG. 2A shows a sectional view of a detail of the carabiner in FIG. 1A.
FIG. 2B shows a sectional view of the detail in FIG. 2A under load.
Figure 1A:
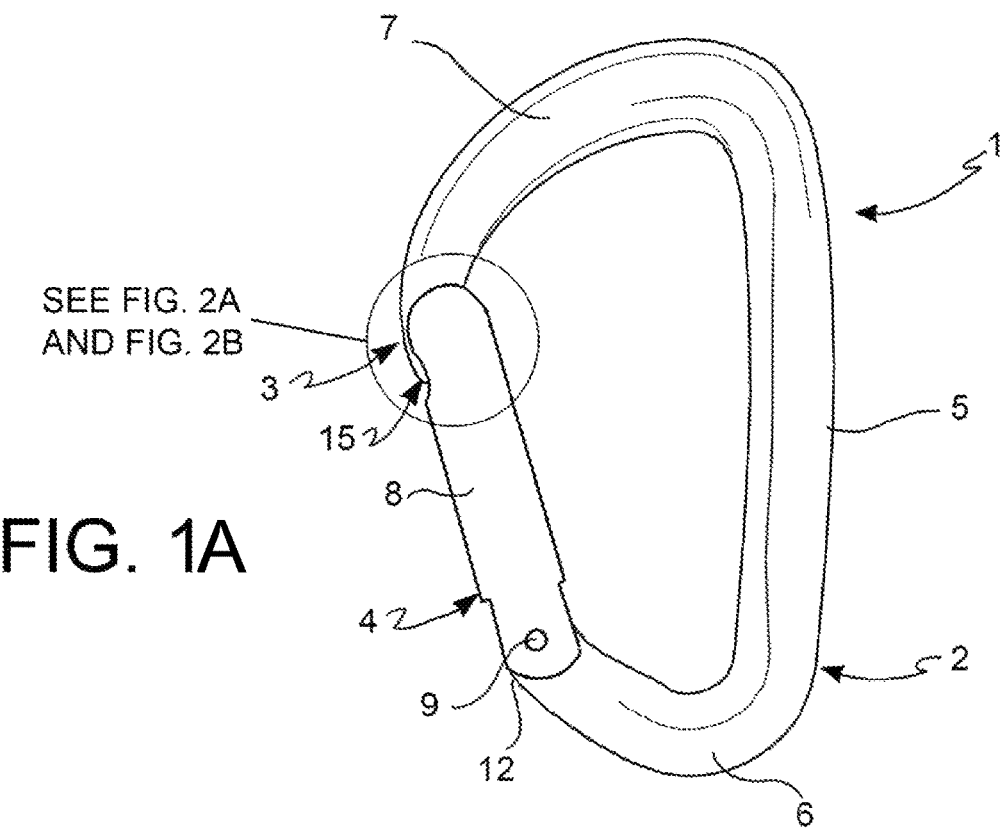
FIG. 1A shows a plan view of the carabiner of FIG. 1 with the spring-closing element located in its normally closed position.

As shown in the Figures, the seat 11 may include a vertical groove 15 for the introduction of the first end 10, a lateral abutment surface 16, an upper stop surface 17 and a lower surface 18. The distance between the lower surface 18 and the upper stop surface 17 may be greater than the dimensions of the coupling portion 13 of the end 10 of the ring 2, in such a way that, under normal conditions, the shoulder 14 is not in contact with the upper stop surface 17 (FIG. 2A).

However, according to the extent of the load applied to the carabiner 1, complex deformations in space may occur, which may include translations and rotations of the ring 2 and of the closing element 4.

For this reason, the surfaces that come into contact between the shoulder 14 and the closing element 4 may not remain constant in time, but can vary in size and location as a function of the load applied.

With the type of geometries involved, the uneven surface, in particular the convex surface of the shoulder 14 can provide a stable coupling following the deformation of ring 2 as a "knee effect" which allows coupling to occur between the closing element 4 and the coupling portion 13 of the ring 2.

Therefore, due to its convex shape, either broken or continuous, of the surface of shoulder 14, a stable and resistant coupling is obtained which prevents the accidental opening of the closing element 4 which can occur with carabiners having "key-lock" systems of the prior art.

In previous devices the surface of shoulder 14 is substantially flat (straight profile) and should be parallel to the surface of the closing element 4 to promote coupling. However, even if such couplings are sensitive to deformations, without necessary precautions, there can be an accidental opening of the closing element 4.

In sharp contrast to earlier devices, carabiners according to the invention significantly improve safety for the user. Carabiners according to the invention are also of simple construction, lightweight and cost-effective.

The above description relates to embodiments of the present invention, and those skilled in the art will be able to make modifications necessary for its adaptation to particular conditions, without departing from the disclosed and claimed subject matter.

The invention claimed is:

1. A carabiner comprising:
   a ring which comprises a side, interrupted by an opening delimited by a first end and a second end,
   wherein said opening is closed by a spring-closing element which can assume an open position and a closed position,
   the spring-closing element comprising a tubular body which comprises a seat at one end,
   the first end of the ring comprises a hooking portion, with a projecting part in a direction transverse to a plane of the carabiner, and
   a coupling portion, on both sides of the hooking portion, comprises a non-planar convex shoulder, when viewed along a direction perpendicular to the plane of the carabiner, such that, when the carabiner is not under load, said convex shoulder is not parallel with a planar upper stop surface of the seat,
   when the spring-closing element is in the closed position and the carabiner is under load, said convex shoulder abuts against the planar upper stop surface of the seat of the spring-closing element such that a first portion of the convex shoulder abuts against the planar upper stop surface of the seat while a second portion of the of the convex shoulder is still not parallel with the planar upper stop surface of the seat so that a stable coupling is achieved, which prevents accidental opening of the closing element when the ring experiences a load, and
   the seat comprises a vertical groove for introduction of said first end of the side of the ring, a lateral abutment surface for the coupling portion, the upper stop surface and a lower surface.

2. The carabiner of claim 1, wherein a distance between the lower surface and the upper stop surface is greater than the dimensions of the coupling portion so that, when the carabiner is not under load, the shoulder is not in contact with the upper stop surface.

3. A carabiner comprising:
   a ring which comprises a side, interrupted by an opening delimited by a first end and a second end,
   the opening of the ring being normally closed by a spring-closing element, and the spring-closing element being able to assume both an open position and a normally closed position,
   wherein the first end of the ring comprises a hooking portion, and the hooking portion projects from the first end of the ring in at least one direction transverse to a plane of the carabiner,
   a coupling portion, of the hooking portion, comprises a non-planar convex shoulder, when viewed along a direction perpendicular to the plane of the carabiner,
   the spring-closing element comprises a tubular body, a first end of the tubular body is pivotably connected to the second end of the ring while a second end of the tubular body comprises a seat, the seat comprises a vertical groove for introduction of the first end of the ring into the tubular member, a lateral abutment surface for receiving the coupling portion, a planar upper stop surface and a lower surface,
   when the carabiner is in its normally closed position and not under load, the convex shoulder does not extend parallel with and is spaced away from the planar upper stop surface of the seat but when the carabiner is in its normally closed position and under load, a first side of the non-planar convex shoulder of the coupling portion engages with the planar upper stop surface while a second side of the non-planar convex shoulder of the coupling portion still remains spaced away from the planar upper stop surface so that a stable coupling is achieved, which prevents accidental opening of the closing element when the ring experiences a load.

4. A carabiner comprising:
   a ring which comprises a side, interrupted by an opening delimited by a first end and a second end,
   the opening of the ring being normally closed by a spring-closing element, and the spring-closing element being able to assume both an open position and a normally closed position,
   wherein the first end of the ring comprises a hooking portion, and the hooking portion projects from the first end of the ring in at least one direction transverse to a plane of the carabiner,
   a coupling portion, of the hooking portion, comprises a first surface and a second surface with a peak located therebetween so as to form a non-parallel convex shoulder,
   the spring-closing element comprises a tubular body, a first end of the tubular body is pivotably connected to the second end of the ring while a second end of the tubular body comprises a seat, the seat comprises a vertical groove for introduction of the first end of the ring into the tubular member, a lateral abutment surface for receiving the coupling portion, a planar upper stop surface and a lower surface,
   when the carabiner is in its normally closed position and not under load, the non-parallel convex shoulder is spaced away from and does not extend parallel with the planar upper stop surface of the seat but when the carabiner is in its normally closed position and under load, the second surface of non-planar convex shoulder engages with the planar upper stop surface while the first surface of the non-planar convex shoulder still remains spaced away from and does not extend parallel to the planar upper stop surface so that a stable coupling is achieved, which prevents accidental opening of the closing element when the ring experiences a load.

* * * * *